(12) United States Patent
Dudek et al.

(10) Patent No.: US 7,065,940 B2
(45) Date of Patent: Jun. 27, 2006

(54) PRODUCT DELIVERY SYSTEM

(75) Inventors: David Robert Dudek, Katy, TX (US); John Melvyn Lloyd Jones, Farmham Surrey (GB); David Campbell Murray, Dublin (IE); Peter Sandiford, St. Albans (GB)

(73) Assignee: Shell Oil Company, Houston, TX (US)

( * ) Notice: Subject to any disclaimer, the term of this patent is extended or adjusted under 35 U.S.C. 154(b) by 550 days.

(21) Appl. No.: 09/843,257

(22) Filed: Apr. 25, 2001

(65) Prior Publication Data

US 2002/0083995 A1 Jul. 4, 2002

(30) Foreign Application Priority Data

Apr. 25, 2000 (EP) ................... 00303470

(51) Int. Cl.
*B65B 1/04* (2006.01)
(52) U.S. Cl. ....................................... 53/473
(58) Field of Classification Search ................. 53/473, 53/266.1, 285, 393
See application file for complete search history.

(56) References Cited

U.S. PATENT DOCUMENTS

| 358,053 A | 2/1887 | Michaels et al. |
| 479,113 A | 7/1892 | Bernard |
| 499,918 A | 6/1893 | Green et al. |
| 501,015 A | 7/1893 | Mann |
| 528,394 A | 10/1894 | Rinn |
| 566,282 A | 8/1896 | Bailey, Jr. |
| 649,121 A | 5/1900 | Wise |
| 1,180,592 A | 4/1916 | Leeper |
| 1,439,329 A | 12/1922 | Randolph |
| 2,188,906 A | 2/1940 | Lackey ........................ 140/71 |
| 2,244,977 A | 6/1941 | Hansman et al. ............... 85/36 |
| 2,597,715 A | 2/1950 | Erikson ....................... 128/272 |
| 2,714,919 A | 3/1951 | Johnston ....................... 153/73 |
| 2,857,947 A | 10/1958 | Powers .......................... 150/5 |
| 3,220,413 A | 4/1961 | Sunnen ........................ 128/261 |
| 3,285,461 A | 9/1962 | Santelli ........................ 220/17 |
| 3,167,210 A | 1/1965 | Carney, Jr. ................... 220/63 |
| 3,307,744 A | 10/1965 | Burford ........................ 222/1 |
| 3,727,789 A | 4/1973 | Rieber, Jr. et al. ........ 220/44 R |
| 3,727,889 A | 4/1973 | Nagel .......................... 259/1 R |
| 3,737,092 A | 6/1973 | Rausing .................... 229/14 B |

(Continued)

FOREIGN PATENT DOCUMENTS

DE     27 14 919 A1     10/1977

(Continued)

OTHER PUBLICATIONS

ABAX Technical Data and English Translation - before 1997.

*Primary Examiner*—Scott A. Smith
*Assistant Examiner*—Brian Nash

(57) ABSTRACT

A product delivery system is provided wherein consumer products are delivered in bulk to the retail site and can be dispensed to individual containers at the retail site. The consumer products can include products in concentrated form that may be diluted prior to dispense or use. The consumer products can include, for example and without limitation, foodstuffs, beverages, household products and automotive products. The product delivery system can include manufacture and/or blending of one or more consumer products at a product manufacturing site, said one or more consumer products being filled into bulk shuttle reservoirs, said one or more bulk shuttle reservoirs being transported to the retail site, and the consumer products contained in said bulk shuttle reservoirs being transferred to individual storage containers for retail to the consumer.

17 Claims, 1 Drawing Sheet

U.S. PATENT DOCUMENTS

| | | | |
|---|---|---|---|
| 3,802,470 A | 4/1974 | Coleman | 141/5 |
| 3,922,779 A | 12/1975 | Cormier | 30/90.8 |
| 3,938,564 A | 2/1976 | Jones | 141/352 |
| 3,966,091 A | 6/1976 | Bencic | 222/129.1 |
| 4,006,841 A | 2/1977 | Alticosalian | 222/42 |
| 4,077,182 A | 3/1978 | Papaluca | 53/109 |
| 4,162,501 A | 7/1979 | Mitchell et al. | 346/140 R |
| 4,189,069 A | 2/1980 | Stoody | 222/83.5 |
| 4,324,494 A | 4/1982 | Pryor et al. | 366/156 |
| 4,330,066 A | 5/1982 | Berliner | 215/1 C |
| 4,340,153 A | 7/1982 | Spivey | 222/1 |
| 4,439,914 A | 4/1984 | Sassano | 29/605 |
| 4,598,840 A | 7/1986 | Burg | 222/135 |
| 4,635,814 A | 1/1987 | Jones | 220/403 |
| 4,832,096 A | 5/1989 | Kohlbach | 141/114 |
| 4,874,107 A | 10/1989 | Arnau-Munoz et al. | 220/20 |
| 4,925,055 A | 5/1990 | Robbins, III et al. | 220/403 |
| 4,929,818 A | 5/1990 | Bradbury et al. | 235/381 |
| 4,934,567 A | 6/1990 | Vahjen et al. | 222/136 |
| 5,014,211 A | 5/1991 | Turner et al. | 364/478 |
| 5,020,917 A | 6/1991 | Homan | 366/161 |
| 5,067,636 A | 11/1991 | Pfeiffer et al. | 222/105 |
| 5,118,003 A | 6/1992 | Pepper et al. | 220/404 |
| 5,285,815 A | 2/1994 | Henry et al. | 137/595 |
| 5,429,263 A | 7/1995 | Haubenwallner | 220/404 |
| 5,474,111 A | 12/1995 | Williamson et al. | 141/1 |
| 5,516,007 A | 5/1996 | Larson | 222/105 |
| 5,568,828 A | 10/1996 | Harris | 141/348 |
| 5,584,327 A | 12/1996 | Thomas et al. | 141/104 |
| 5,592,940 A | 1/1997 | Kampfe et al. | 128/654 |
| 5,685,435 A | 11/1997 | Picioccio et al. | 209/677 |
| 5,758,571 A | 6/1998 | Kateman et al. | 99/455 |
| 5,860,742 A | 1/1999 | Faircloth, Jr. | 383/80 |
| 5,870,906 A | 2/1999 | Denisar | 68/17 R |
| 5,873,268 A | 2/1999 | Spriggs et al. | 68/17 R |
| 5,890,611 A | 4/1999 | Podd | 220/1.5 |
| 5,948,461 A | 9/1999 | Miller | 426/565 |
| 5,955,132 A | 9/1999 | Spica et al. | 426/399 |
| 5,996,316 A | 12/1999 | Kirschner | 53/443 |
| 5,996,824 A | 12/1999 | Grant et al. | 215/2 |
| 5,997,236 A | 12/1999 | Picioccio et al. | 414/403 |
| 6,058,984 A | 5/2000 | Sato | 141/7 |
| 6,149,129 A | 11/2000 | Harris et al. | 251/149.1 |
| 6,250,348 B1 | 6/2001 | Reinholdt | 141/382 |

FOREIGN PATENT DOCUMENTS

| | | | |
|---|---|---|---|
| DE | 37 27 789 A1 | 3/1988 | |
| DE | 39 22 779 A1 | 1/1991 | |
| DE | 94 21 530 U 1 | 3/1996 | |
| DE | 44 39 914 A1 | 5/1996 | |
| DE | 196 07 255 A1 | 8/1997 | |
| DE | 198 13 842 A1 | 9/1999 | |
| DE | 299 13 528 U1 | 1/2000 | |
| DE | 199 36 645 A1 | 4/2000 | |
| EP | 0 358 053 A2 | 3/1990 | |
| EP | 0 479 113 A1 | 4/1992 | |
| EP | 0 499 918 A2 | 8/1992 | |
| EP | 0501015 A1 | 9/1992 | |
| EP | 0 528 394 A1 | 2/1993 | |
| EP | 0 649 121 A2 | 4/1995 | |
| FR | 1 180 592 | 6/1959 | 20/4 |
| GB | 2188906 A | 10/1987 | |
| GB | 2244977 A | 12/1991 | |
| WO | WO 94/24010 | 10/1994 | |
| WO | WO 96/01227 | 1/1996 | |
| WO | WO 97/02898 | 1/1997 | |
| WO | WO 97/18538 | 5/1997 | |
| WO | WO 00/03944 | 1/2000 | |

PRODUCT DELIVERY SYSTEM

This application claims priority to the foreign application filed on Apr. 25, 2000, in Europe and having a serial number of 00303470.9.

FIELD OF THE INVENTION

The present invention relates to a product delivery system.

BACKGROUND OF THE INVENTION

Currently, consumer products companies (CPC) manufacture fast-moving consumer products that are subsequently packaged in small individual disposable storage containers. Said individual storage containers are then distributed to retail sites, whereupon consumers select said consumer products from retail shelves for purchase and subsequent use.

The limitations imposed by the current state of the art are such that it is difficult to implement in a cost effective manner and that it places great demands on the product delivery system in terms of logistics and resources.

SUMMARY OF THE INVENTION

According to the present invention there is provided a product delivery system wherein consumer products are delivered in bulk to the retail site; said product delivery system comprising:

(i) manufacture and/or blending of one or more consumer products at a product manufacturing site;

(ii) said one or more consumer products being filled into one or more bulk shuttle reservoirs;

(iii) said one or more bulk shuttle reservoirs being placed on to one or more pallets;

(iv) said one or more pallets being transported to the retail site;

(v) one or more of said bulk shuttle reservoirs being removed from said pallets; and (vi) the consumer products contained in said bulk shuttle reservoirs being transferred to individual storage containers for retail to the consumer.

In a preferred embodiment of the present invention, the product delivery system may include an optional step prior to step (iv) wherein said one or more pallets are transported through the usual product distribution network.

By "usual product distribution network" is meant the CPC's warehouse and/or the retailer's regional distribution centre (RDC).

It will be appreciated that one or more reservoirs may be removed from, or added to, the pallets at the usual product distribution network, or in a preferred embodiment of the present invention said pallets may be transported onwards to the retail site in their original state.

It will be further appreciated that transportation of pallets in the present invention, may occur using any of the commonly used routes in the art, for example by sea, air, rail or road.

Bulk shuttle reservoirs in the present invention may be of any kind commonly used in the art. Said bulk shuttle reservoirs may be moulded to meet the requirements of the user, for example, by roto-moulding or blow-moulding to give a convenient shape. The size of such bulk shuttle reservoirs is not limited. In a preferred embodiment, said bulk shuttle reservoirs may be up to 1000 liters in volume.

In a preferred embodiment of the present invention, said bulk shuttle reservoirs may comprise a dry break coupling system.

Dry break coupling systems are known in the art and are commonly used in the brewing industry.

A dry break coupling system ensures product integrity and minimises the potential for product counterfeiting by offering a closed system. Such a system provides benefits to the consumer, the retailer and the consumer product brand owner.

When the bulk shuttle reservoirs arrive at the retail site, they may be conveniently stored until required. At that time, consumer product may be transferred from the bulk reservoir to individual storage containers.

It will be appreciated that the value to both the CPC and the retailer in terms of cost, efficiency, space and logistics can be further improved if the consumer product is transported by the system of the present invention in a concentrated form, requiring dilution before its end-use.

The consumer product may be reconstituted and transferred to individual packs either as part of the usual distribution system, that is to say at the CPC's warehouse and/or the retailer's RDC, or in a preferred embodiment of the present invention, at the retail site.

Thus, in a preferred embodiment of the present invention, there is included an optional step of consumer product reconstitution prior to step (vi).

The reconstitution and transfer of consumer product from the bulk shuttle reservoir to individual storage containers may be performed manually by personnel in said locations. However, such a method is inefficient in terms of time and resources. Thus, in a preferred embodiment of the present invention, the reconstitution and transfer of consumer product would be automated.

It will be appreciated that, as previously encountered in traditional product delivery systems, reconstitution and transfer of consumer product will also lead to large quantities of individual storage containers requiring storage in the usual distribution network, and/or in the store room and on the shop floor of the retail site, depending upon the location of reconstitution and transfer.

It is therefore preferred that consumer product is maintained as a concentrated consumer product for as far down the product delivery system supply chain as is possible, that is to say to the retail site.

As space is at a premium in a retail site, it is highly desirable to delay the transfer and reconstitution of said consumer product to individual storage containers until, or just prior to, the time of purchase by the consumer. Reducing the retail space required to sell consumer products, results in an increase in the retailer's economic return per square metre of retail space. This benefits the retailer and may also benefit the CPC, in the case that they are paying the retailer for retail space.

In a preferred embodiment of the present invention, the consumer product will be transferred to, optionally reconstituted in, and dispensed from a vending machine.

It will be appreciated that consumer product may be transferred from the bulk shuttle reservoir to a storage reservoir within said vending machine, for example through a pump inside the machine, or, alternatively, the bulk shuttle reservoir may be designed to be housed inside the vending machine.

Vending machines may dispense a wide variety of products from the same machine.

By "vending machine" in the present invention, is meant a filling machine that dispenses product in response to one or more selections that are input into the machine by the user. Such a system may be operated by coin, token, card, or other suitable means.

The use of a vending system offers a better, differentiated shopping experience. In view of the cost benefits that the product delivery system of the present invention offers to CPCs and retailers, it may be possible to transfer on these benefits on to the consumer. Thus, the present invention offers advantages to the CPC, the retailer, and the consumer alike.

The use of a vending machine offers further benefits including being able to offer greater consumer information, for example, with smart card technology and Internet access. Furthermore, point-of-sale (POS) advertising may be available on video displays, and may, for example, be downloaded on a daily basis from the Internet. It is particularly preferred that said vending machine offer automated inventory control, thereby ensuring enhanced product delivery system supply chain responsiveness and inventory management.

Said thereby reconstituted consumer product may then be dispensed into an individual storage container.

In a preferred embodiment, the consumer product may be customised by the consumer prior to optional reconstitution and/or dispense into an individual storage container.

By "customisation" in the present invention is meant that the precise formulation of a product may be determined by the consumer, that is to say, the consumer may select from ingredients and determine the mix of ingredients according to need or personal preference.

Depending on the precise retail location of the vending machine, the consumer may be required to pay at the check-out of the retail site, or alternatively may be required to insert payment into said vending machine.

The nature of said storage container that may be employed in the present invention is not limited and may be of any kind known in the art. Said storage container will preferably be a closed vessel, for example having a bottom portion, peripheral side walls and an upper portion.

Standard storage containers are available in a wide variety of shapes and forms. They may be assembled from a wide variety of components, and may be manufactured from a wide variety of materials.

Said storage containers may be conveniently manufactured from a plastics material. As such, said storage container may be manufactured by any conventional forming process, such as by an extrusion or an injection blow-moulding process.

The storage containers may include any dispensing, dosing or application feature or device providing the means to dispense the product in a wide variety of ways.

In addition, the design of said storage containers may include provision for manual or powered dispensing.

In a preferred embodiment of the present invention, the storage container will be of a reusable nature, that is to say, the consumer may purchase the container initially at the retail site, and then after use, may return said storage container to the retail site to be refilled; this can be repeated a number of times.

As a result of cost savings due to the reusable nature of the storage container, it is possible to offer greater functionality in the storage container and still maintain cost-competitiveness over the life of the storage container.

Improved functionality may include, for example, better dosage mechanism, easier and more efficient storage, better handling, easier to transport from the store, enhanced aesthetics, different colours, and child resistant closures.

After use, the empty, or partially-empty bulk shuttle reservoir may be transported back to the consumer product manufacturing site for re-use. The route taken back to the manufacturing site may be a direct one, or in the alternative the route may be the reverse of the product delivery system, that is to say, through the usual product distribution network.

Thus, the product delivery system of the present invention which includes features of bulk delivery of concentrate, customer-led dispense of product, and re-use of both the bulk shuttle reservoir and the storage container, allows packaging, filling and distribution costs to be greatly reduced.

The product delivery system of the present invention may be conveniently used to deliver a wide variety of fast-moving consumer products from the manufacturer to the consumer. Consumer products that may typically be delivered include, for example, foodstuffs, beverages, household products such as detergents, and automotive products.

BRIEF DESCRIPTION OF THE DRAWING

The present invention will now be described by way of example with reference to the accompanying drawing. It is to be noted, however, that the accompanying drawing illustrates only some embodiments of the invention and is therefore not to be considered limiting of its scope, because the invention may admit to other equally effective embodiments.

DETAILED DESCRIPTION OF THE INVENTION

Figure 1:
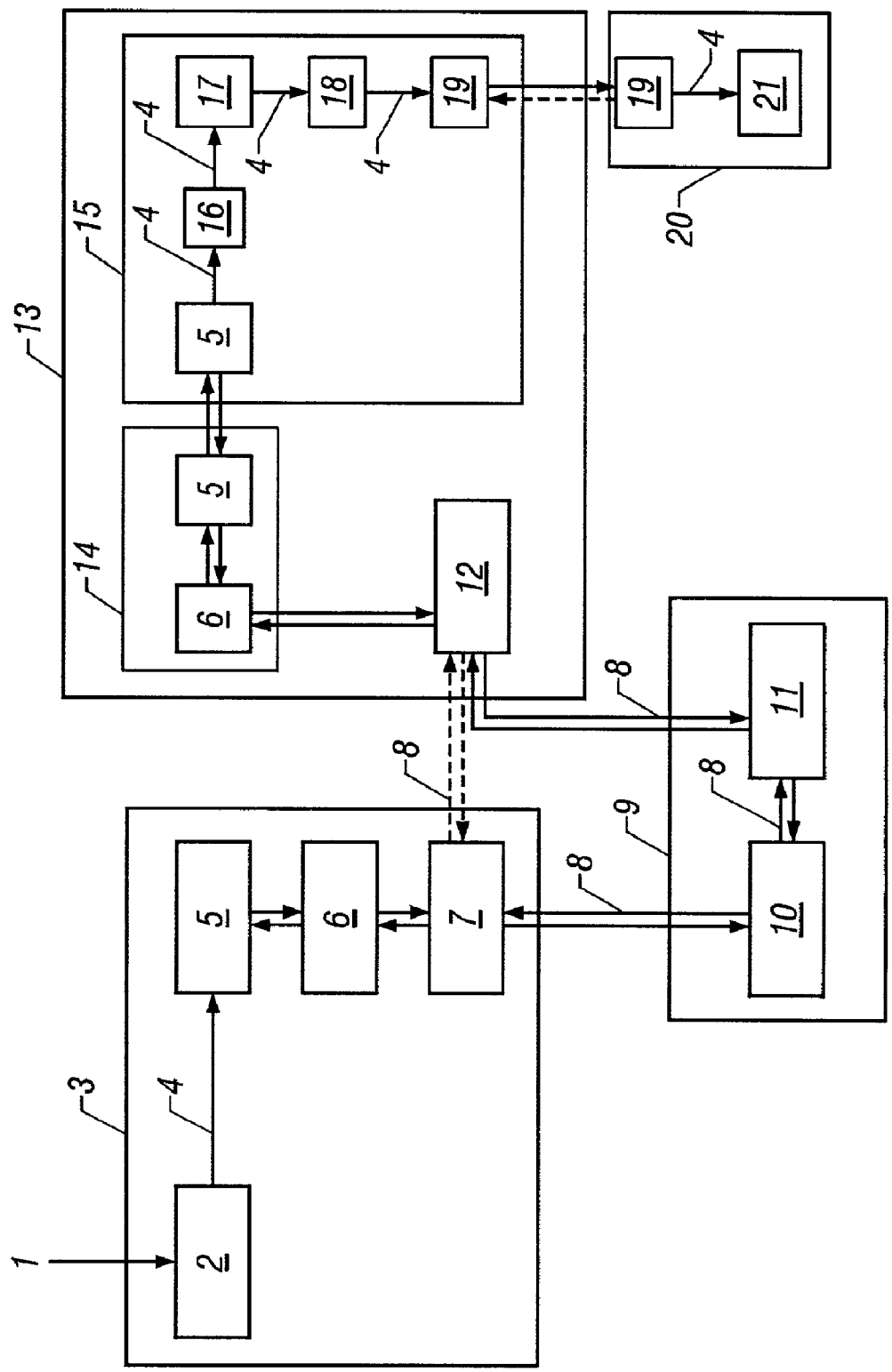

Ingredients 1 are blended in a unit 2 at a consumer product manufacturing site 3, in a manner commonly used in the art in order to produce a consumer product 4.

Said consumer product 4 is transferred to a bulk shuttle reservoir 5, said bulk shuttle reservoir comprising a dry break coupling system (not shown), said dry break coupling system being in an open position. Said dry break coupling system is subsequently closed, and the bulk shuttle reservoir 5 is placed on a pallet 6.

The pallet 6, containing one or more bulk shuttle reservoirs 5, is transported to a warehousing location 7 of said consumer product manufacturing site 3, whereupon one or more pallets 6 are placed in a transporter 8.

Said transporter 8 then transports the pallets 6 through the usual product distribution network 9. Said usual product distribution network involves transporting said pallets 6 on the transporter 8 from the CPC's warehouse 10 to the retailer's RDC 11.

The pallets 6 are then transported by a transporter 8 to a receiving location 12 of a retail site 13.

Pallets 6 are removed from the transporter 8, and are transferred by means typically used in the art, to a storage location 14 of the retail site 13.

When required by the retailer, one or more bulk shuttle reservoirs 5 may be removed from a pallet 6 in the storage location 14, and transported to a vending machine 15. Said bulk shuttle reservoirs will be typically transported to vending machine 15 using a hand-pallet of the kind commonly used in the art.

The dry coupling system of the bulk shuttle reservoir is opened and the consumer product 4 is pumped by a pump 16 to a storage reservoir 17 in the vending machine 15.

Said consumer product 4 may be subsequently dispensed by a pump 18 to an individual reusable storage container 19 in response to a consumer's filling selection on the vending machine control panel.

Said reusable storage container is transported by the consumer to a consumer use location 20, for example in the consumer's house, whereupon the consumer product 4 contained in said reusable storage container may be transferred to a point of use 21. The point of use may be, for example, a piece of household apparatus such as a washing machine in the case of said consumer product 4 being a household detergent product.

It is emphasised that the above sequence of steps may be varied by, for example, transporting the pallets 6 containing one or bulk shuttle reservoirs 5 directly from the consumer product manufacturing site 3 to the retail site 13, or by the use of storage containers 19 which are not in fact returned to the vending machine 15 for refilling.

While the foregoing is directed to various embodiments of the present invention, other and further embodiments may be devised without departing from the basic scope thereof. For example, the various methods and embodiments of the invention can be included in combination with each other to produce variations of the disclosed methods and embodiments. Also, the directions such as "top," "bottom," "left," "right," "upper," "lower," and other directions and orientations are described herein for clarity in reference to the figures and are not to be limiting of the actual device or system or use of the device or system. The device or system may be used in a number of directions and orientations. Further, the order of steps can occur in a variety of sequences unless otherwise specifically limited. The various steps described herein can be combined with other steps, interlineated with the stated steps, and/or split into multiple steps.

The invention claimed is:

1. A product delivery method wherein household cleaning and detergent consumer products are delivered in bulk to a retail site, said product delivery method comprising steps to:
    (i) manufacture and optionally blend one or more said household cleaning and detergent consumer products at a product manufacturing site;
    (ii) fill said one or more household cleaning and detergent consumer products into one or more bulk shuttle reservoirs;
    (iii) place said one or more bulk shuttle reservoirs onto one or more pallets;
    (iv) transport said one or more pallets to the retail site;
    (v) remove one or more of said bulk shuttle reservoirs from said pallets; and
    (vi) transfer the household cleaning and detergent consumer products contained in said bulk shuttle reservoirs to individual storage containers at the retail site for retail to the consumer.

2. The product delivery method according to claim 1, wherein said one or more pallets are transported through a product distribution network prior to the transport to the retail site.

3. The product delivery method according to claim 1, wherein the bulk shuttle reservoirs comprise a dry break coupling method.

4. The product delivery method according to claim 1, wherein the one or more household cleaning and detergent consumer products are in a concentrated form.

5. The product delivery method according to claim 4, wherein said method is adapted to optionally allow consumer product reconstitution prior to the transfer of the household cleaning and detergent consumer products to the individual storage containers.

6. The product delivery method according to claim 5, wherein the optional reconstitution and subsequent transfer of the one or more household cleaning and detergent consumer products to said individual storage containers is automated.

7. The product delivery method according to claim 4, wherein the one or more household cleaning and detergent consumer products are transferred to, optionally reconstituted in, and dispensed from a vending machine into said individual storage containers.

8. The product delivery method according to claim 4, wherein the one or more household cleaning and detergent consumer products are transferred into a reusable individual storage container.

9. The product delivery method according to claim 8, wherein said method is adapted to optionally allow consumer product reconstitution prior to the transfer of the household cleaning and detergent consumer products to the individual storage containers.

10. The product delivery method according to claim 1, wherein the one or more household cleaning and detergent consumer products are transferred to, optionally reconstituted in, and dispensed from a vending machine into said individual storage containers.

11. The product delivery method according to claim 1, wherein the one or more household cleaning and detergent consumer products are transferred into a reusable individual storage container.

12. A product delivery method wherein household cleaning and detergent consumer products are delivered in bulk to a retail site, said product delivery method comprising steps to:
    (i) manufacture and optionally blend one or more of said household cleaning and detergent consumer products at a product manufacturing site in a concentrated form;
    (ii) fill said one or more household cleaning and detergent consumer products into one or more bulk shuttle reservoirs;
    (iii) transport said one or more bulk shuttle reservoirs to the retail site;
    (iv) reconstitute said one or more household cleaning and detergent consumer products at the retail site; and
    (v) transfer said one or more reconstituted household cleaning and detergent consumer products to individual storage containers at the retail site for retail to the consumer.

13. The product delivery method according to claim 12, wherein the one or more household cleaning and detergent consumer products are transferred to and dispensed from a vending machine at the retail site into said individual storage containers.

14. The product delivery method according to claim 12, wherein said individual storage containers for said household cleaning and detergent consumer products comprises reusable containers.

15. A product delivery method wherein household cleaning and detergent consumer products are delivered in bulk to a retail site, said product delivery method comprising steps to:
    (i) manufacture and optionally blend one or more said household cleaning and detergent consumer products at a product manufacturing site;
    (ii) fill said one or more household cleaning and detergent consumer products into one or more bulk shuttle reservoirs;
    (iii) transport said one or more bulk shuttle reservoirs to the retail site; and
    (iv) transfer said one or more household cleaning and detergent consumer products to and dispense from a vending machine into individual storage containers at the retail site for retail to the consumer.

16. The product delivery method according to claim 15, wherein the one or more household cleaning and detergent consumer products are transported in a concentrated form in the bulk shuffle reservoirs and wherein said product delivery method is adapted to reconstitute said one or more household cleaning and detergent consumer products at the retail site for dispense through said vending machine.

17. The product delivery method according to claim 15, wherein said individual storage containers for said household cleaning and detergent consumer products comprises reusable containers.

* * * * *